(12) United States Patent
Knowlton et al.

(10) Patent No.: US 10,060,262 B2
(45) Date of Patent: Aug. 28, 2018

(54) VIBRATION DAMPERS FOR TURBINE BLADES

(71) Applicant: United Technologies Corporation, Farmington, CT (US)

(72) Inventors: Robert Knowlton, Vernon, CT (US); Max Asterlin, Vernon, CT (US); Brandon M. Rapp, West Hartford, CT (US); Parth Jariwala, Manchester, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 241 days.

(21) Appl. No.: 14/895,139

(22) PCT Filed: May 28, 2014

(86) PCT No.: PCT/US2014/039710
§ 371 (c)(1),
(2) Date: Dec. 1, 2015

(87) PCT Pub. No.: WO2015/026416
PCT Pub. Date: Feb. 26, 2015

(65) Prior Publication Data
US 2016/0102557 A1    Apr. 14, 2016

Related U.S. Application Data

(60) Provisional application No. 61/830,249, filed on Jun. 3, 2013.

(51) Int. Cl.
*F01D 5/10* (2006.01)
*F01D 11/00* (2006.01)
(Continued)

(52) U.S. Cl.
CPC .............. *F01D 5/10* (2013.01); *F01D 5/081* (2013.01); *F01D 5/18* (2013.01); *F01D 5/26* (2013.01);
(Continued)

(58) Field of Classification Search
CPC ... F01D 5/10; F01D 5/081; F01D 5/18; F01D 5/26; F01D 11/006; F05D 2240/57; F05D 2260/96
See application file for complete search history.

(56) References Cited

U.S. PATENT DOCUMENTS 4,767,260 A *  8/1988  Clevenger ............... F01D 9/041
                                                   415/115
5,281,097 A    1/1994  Wilson et al.
(Continued)

FOREIGN PATENT DOCUMENTS

EP    1452694 A2    9/2004
EP    2053286 A1    4/2009
(Continued)

OTHER PUBLICATIONS

English Translation to Abstract JP2003035105.
(Continued)

*Primary Examiner* — Igor Kershteyn
*Assistant Examiner* — Eric Zamora Alvarez
(74) *Attorney, Agent, or Firm* — Cantor Colburn LLP

(57) ABSTRACT

A turbine blade vibration damper is described. The damper has an axially-extending main body defining an inner surface and opposed damping surface. The main body also has an edge spanning from the inner surface to the damping surface and slotted apertures extending through the main body. The slotted apertures extend between the inner surface and damping surface. Adjacent pairs of slotted apertures
(Continued)

have elongated shapes defining longitudinal axes that intersect at a point off the surface of the damper.

15 Claims, 3 Drawing Sheets

(51) Int. Cl.
    *F01D 5/18*     (2006.01)
    *F01D 5/26*     (2006.01)
    *F01D 5/08*     (2006.01)

(52) U.S. Cl.
    CPC ........ *F01D 11/006* (2013.01); *F05D 2240/57* (2013.01); *F05D 2260/96* (2013.01); *Y02T 50/676* (2013.01)

(56) References Cited

U.S. PATENT DOCUMENTS

| | | | |
|---|---|---|---|
| 5,313,786 A | 5/1994 | Chlus et al. | |
| 5,415,526 A | 5/1995 | Mercadante et al. | |
| 7,163,376 B2 * | 1/2007 | Itzel | F01D 5/16 416/193 A |
| 7,322,797 B2 | 1/2008 | Lee et al. | |
| 8,128,365 B2 | 3/2012 | De Cardenas | |
| 8,240,981 B2 * | 8/2012 | Spangler | F01D 5/081 415/115 |
| 2007/0134099 A1 | 6/2007 | Lee et al. | |
| 2009/0060712 A1 | 3/2009 | De Cardenas | |
| 2009/0116953 A1 | 5/2009 | Spangler et al. | |

FOREIGN PATENT DOCUMENTS

| | | |
|---|---|---|
| GB | 2490216 A | 10/2012 |
| JP | 2003035105 A | 2/2003 |

OTHER PUBLICATIONS

Supplementary European Search Report for Application No. EP14837891.
English Translation to Specification and Claims for JP2003035105.
PCT International Search Report for International Application No. PCT/US2014/039710; International Filing Date: May 28, 2014; dated Feb. 27, 2015; 3 pgs.

* cited by examiner

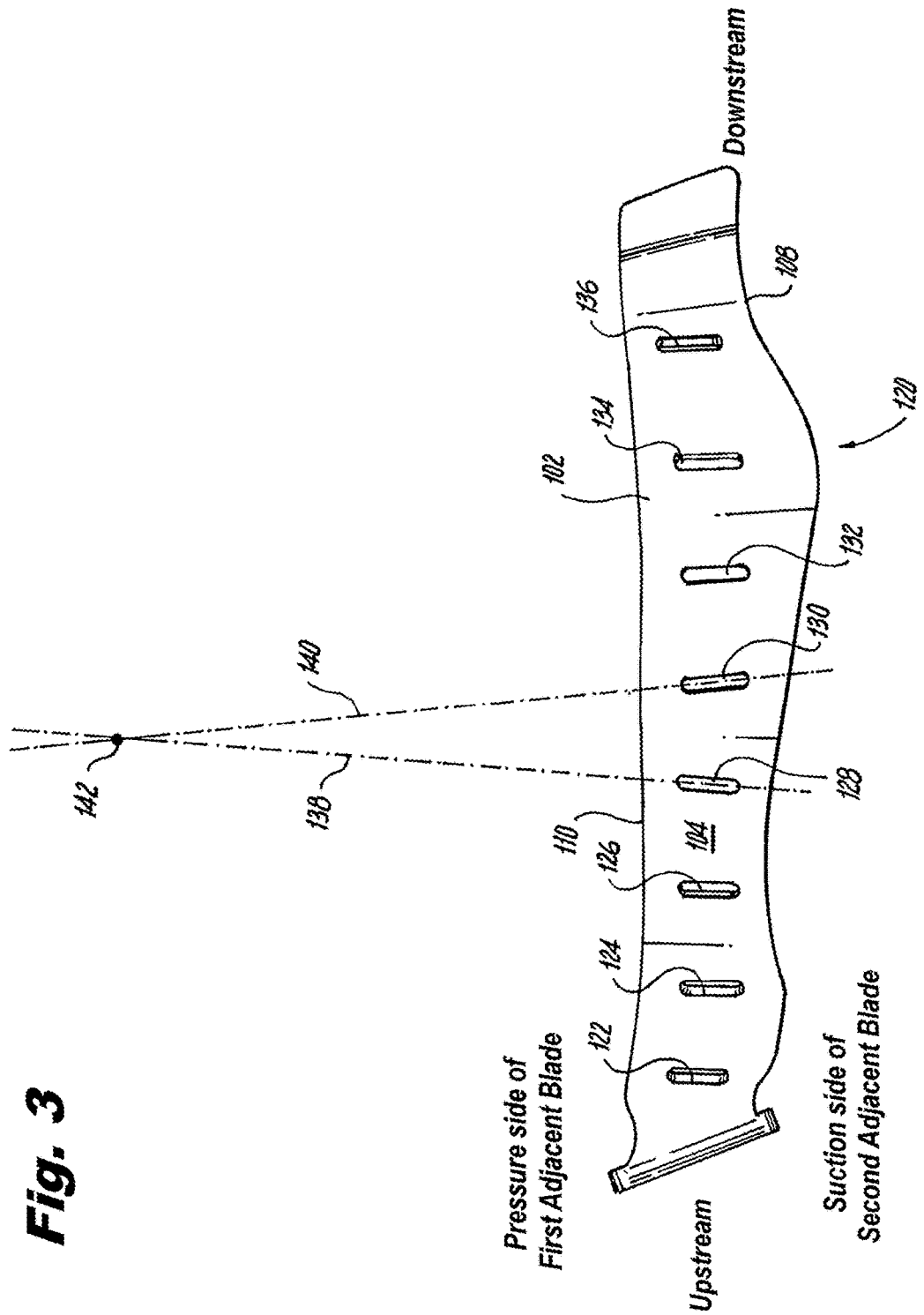

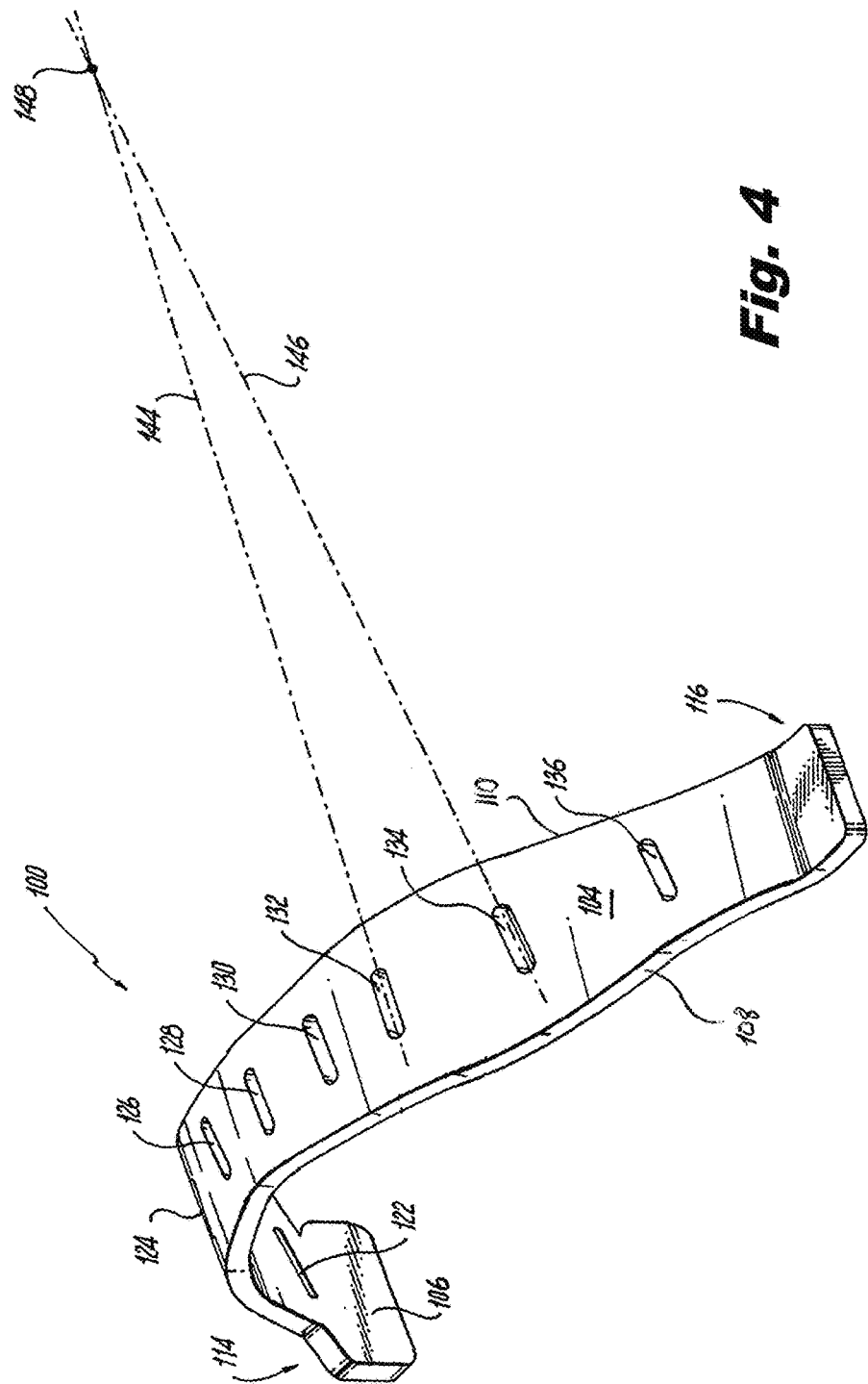

VIBRATION DAMPERS FOR TURBINE BLADES

RELATED APPLICATIONS

This application claims the benefit of and priority to U.S. Provisional Patent Application No. 61/830,249 filed Jun. 3, 2013, the contents of which are incorporated herein by reference.

BACKGROUND OF THE INVENTION

Field of the Invention

The subject invention relates to turbine blade vibration dampers, and more particularly to turbine blade dampers with coolant apertures.

Description of Related Art

Matefaces extend along the opposing edges of adjacent turbine blade platforms. Blade platform matefaces generally extend axially along the blade platform from the upstream (leading) edge of the blade to the downstream (trailing) edge of the blade. Blade platforms of adjacent turbine blades further define a mateface gap between the opposing matefaces. Since blades move in response to variation force applied to the blades airfoil by the combustion gases during operation, the mateface gap prevents opposed blade platforms from contact one another during operation. The turbine disk can also include turbine blade vibration dampers arranged beneath portions of adjacent blades and extending across the gap for purposes of stiffening the blade structures and reducing blade platform movement during engine operation.

Hot combustion gases transiting the mateface gap can damage the mateface edges of the blade platforms. For example, the hot gases can heat the platform material such that the mechanical properties of the material change, thereby weakening the blade structure. The gases can also remove material from the blade platform mateface edges. In extreme situations, hot combustion gases can erode or burn back the blade platform mateface. This can reduce engine efficiency and require that the engine be taken out of service so that the damaged blades can be replaced. Some turbine blades therefore include cooling channels extending through the structure for supplying coolant portions of the turbine otherwise vulnerable to damage from exposure to hot combustion gases.

Such conventional methods and systems have generally been considered satisfactory for their intended purpose. However, there is a continuing need to improve engine efficiency such as by reducing the amount of coolant necessary for blade platform mateface cooling. There is also a need for more uniform blade platform mateface cooling. There also remains a need for turbine blades and blade vibration dampers that are easy to make and use. The present invention provides solution to these and other needs in the art.

SUMMARY OF THE INVENTION

The subject invention is directed to a new and useful turbine blade vibration damper. The damper has an axially-extending main body defining an inner surface and opposed damping surface with an edge spanning the inner and damping surfaces. Slotted apertures extend through damper main body with elongated shapes defining longitudinal axes. Axes of an adjacent aperture pair intersect at a point off the surface of the damper. In an embodiment, the damper main body has at least six slotted apertures, and in an exemplary embodiment, the damper has eight slotted apertures.

In certain embodiments the axes intersect at a point off the pressure edge of the vibration damper. It is also contemplated that at least one or both of the damper edges is a contoured edge. The contoured edge or edges are configured and arranged for mechanical contact with blade roots of turbine blades adjacent the damper. In an exemplary embodiment, the turbine blade damper is movably captured within a cavity defined by the blade roots of the adjacent turbine blades.

In accordance with certain embodiments, the main body defines an upstream segment with an upstream oriented face. It is also contemplated that the upstream segment can have slotted aperture extending through the main body. It is further contemplated that damper main body define a downstream segment with a radially outward oriented surface. The downstream segment can have a slotted aperture extending through the main body. In an embodiment, adjacent pairs of apertures define respective aperture planes obliquely oriented with respect to one another.

The invention also provides a turbine blade vibration damper as described above wherein at least one pair of adjacent slotted apertures define axes that are skew lines. It is contemplated that the skew lines define an apparent point of intersection off the pressure edge of the damper.

The invention additionally provides a turbine disk for a gas turbine. The turbine disk has a disk periphery with a plurality of disk slots and a coolant channel extending to the disk periphery. First and second blades with respective blade platforms and blade roots are disposed in adjacent disk. The adjacent blade roots, disk periphery, and inner surfaces of the blade platforms define a cavity between the adjacent blades. A turbine damper is movably captured within the cavity such that an inner damper surface is fluidly communicative with the coolant channel, and a portion of the damper damping surface is fluidly communicative with a mateface gap between the adjacent blade platforms. The turbine blade damper has a plurality of slotted apertures extending through the main body configured and arranged to supply coolant supplied to the damper inner surface to the matefaces of the opposed blade platforms.

In an embodiment, the slotted apertures are imperfectly spaced and angled with respect to one another. In an exemplary embodiment, the arrangement of the slotted apertures supplies sufficient coolant to the matefaces notwithstanding a changeable positional relationship of the movably captured damper, slotted apertures, and mateface edges during engine operation.

These and other features of the systems and methods of the subject invention will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, preferred embodiments thereof will be described in detail herein below with reference to certain figures, wherein:

FIG. 3 is a plan view of the turbine blade damper of FIG. 2, showing the arrangement of slotted apertures in the damper main body;

FIG. 4 is a perspective view of the turbine blade damper of FIG. 2, showing the profile of the damper.

DETAILED DESCRIPTION OF THE PREFERRED EMBODIMENTS

Figure 1:
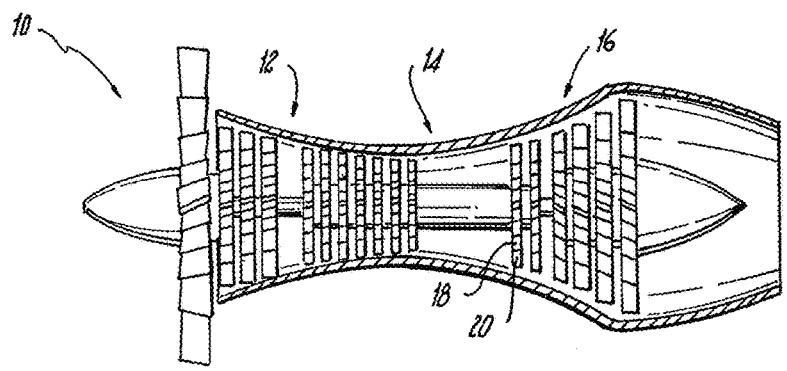
FIG. 1 is a schematic cross-sectional view of a gas turbine, showing the location of the turbine disk within the turbine section.

Reference will now be made to the drawings wherein like reference numerals identify similar structural features or aspects of the subject invention. For purposes of explanation and illustration, and not limitation, a partial view of an exemplary embodiment of the turbine blade vibration damper in accordance with the invention is shown FIG. 2 and designated generally by reference character 100. Other embodiments of the turbine blade damper in accordance with the invention, or aspects thereof, are provided the figures, as will be described. The turbine blade damper of the invention can be used in gas turbines, such as aircraft main engines for example.

Referring now to FIG. 1, a gas turbine 10 is shown. Gas turbine 10 includes a compressor 12, a combustor 14, and a turbine 16 axially arranged and coupled together by a shaft. Turbine 16 includes a turbine disk 18. Turbine disk 18 includes a plurality of turbine blades 20. Turbine disk 18 is a first stage disk high pressure turbine disk that is positioned immediately downstream of combustor 14. As will be appreciated, the turbine dampers described herein are also suitable for use on other high pressure stages as well as in low pressure turbine disks.

Operatively, working fluid enters gas turbine 10 at an inlet of the compressor. The fluid flows through the compressor which pressurizes the working fluid, increasing its temperature and pressure. The working fluid thereafter enters combustor 14 where it is mixed with fuel and ignited, the fluid being converted to hot combustion gases and undergoing further pressurization and temperature increase. The hot combustion gases then enter turbine 16 where they are expanded by moving across blade 20 of turbine disk 18. Combustion gases moving across turbine blade 20 apply force to a pressure side of the blade. The blade transfers this force to the blade disk which causes the disk to rotate. Rotating of disk 18 in turn rotates the shaft which in turn rotates the compressor and other engine components such as an optional fan disk coupled positioned at the inlet to compressor 12. As will be appreciated, coolant can be extracted from compressor 12 and conveyed to turbine 16 where it can supplied to engine components exposed to hot combustion gases such as turbine blade 20.

Figure 2:
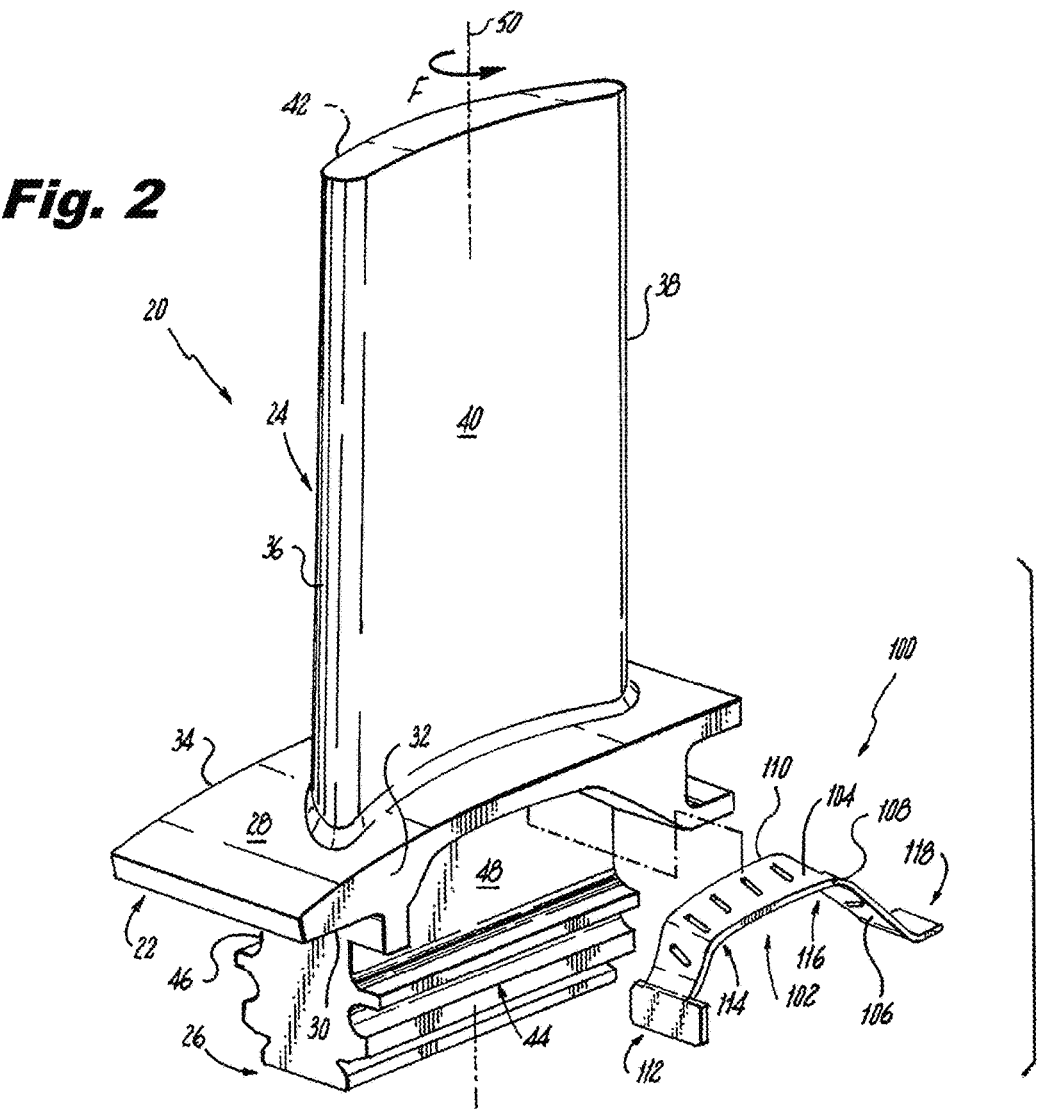
FIG. 2 is a perspective view of an exemplary embodiment of a portion of a turbine disk, showing a turbine blade vibration damper constructed in accordance with the present invention.

Referring now to FIG. 2, turbine blade 20 and vibration damper 100 are shown. Turbine blade 20 includes a blade platform 22, an airfoil portion 24, and a root portion 26. Blade platform 22 defines an outer surface 28 and an inner surface 30. Blade platform 22 also defines a periphery extending about the platform, respective axially extending portions of blade platform 22 defining a first mateface 32 extending along a pressure side of blade 20 and a second mateface 34 extending along a suction side of blade 20. As illustrated in FIG. 2, matefaces 32 and 34 a parallel. This is for illustration purpose and is non-limiting. In other embodiments matefaces 32 and 34 may not parallel and may have non-planar surfaces.

Airfoil portion 24 extends radially outward from the platform outer surface 28, and defines a leading edge 36, a trailing edge 38, a pressure surface 40, and an opposed suction surface 42. Leading edge 36 is arranged upstream of trailing edge 38 with respect to combustion gas flow across blade 20. Pressure surface 40 axially spans leading and trailing edges 36 and 38 along the radial height of blade 20, thereby defining the pressure side the blade airfoil extending along a radial height of the airfoil. Suction surface 42 axially spans leading edge 36 and trailing edge 38, thereby further defining a suction side of the blade airfoil extending along a radial height of the airfoil.

Root portion 26 of blade 20 extends radially inward from inner surface 30 platform 22. Root portion 26 defines a root pressure side 44 and an opposed root suction side 46. Inner surface 30 of blade platform 22 and root pressure side 44 collectively define a portion of a cavity 48 configured and adapted to movably capture a turbine damper 100. For example, in the illustrated embodiment, root suction side 44 defines an upstream and a downstream protrusion corresponding with the profile of damper 100. A corresponding cavity portion is defined on root suction side of an adjacent blade such that damper 100 is movably captured with the cavity portions and underlying disk periphery. As would be appreciated, root portion 26 defines a cross-section configured and adapted such that the root portion can be received into a correspondingly shaped slot of a turbine disk, such as the exemplary fir tree profile root portion 26 illustrated in FIG. 2.

Combustion gases transiting turbine section 16 apply force to pressure surface 40. Airfoil portion 24 transfers this force to root portion 26 which in turn pushes against the disk slot, thereby rotating disk 18. This force also induces a twisting, or clocking, rotational force F about an axis 50 of blade 20. Depending on magnitude, force F displace blade within the blade slot. Force F can also distort the shape of the blade platform. Displacement and/or distortion of blade platform 22 in turn causes matefaces 32 and 34 to change position. As will be appreciated, such displacement and/or distortion can change the width and shape of the mateface gap between adjacent blades. As will be further appreciated, changing the width and shape of the mateface gap can change the cooling requirements of the mateface.

The force applied to pressure surface 40 can also vary during engine operation, such as by pulsation of an individual combustor or from the travel of the blade between successive combustors during disk rotation. This causes force F to vary which in turn causes the above-described mateface positional changes to vary continuously during engine operation. This can cause hot combustion gases to be captured or linger around blade platform structures like the matefaces, potentially causing erosion or burnback of one or both of the opposed matefaces.

With reference to FIG. 2, turbine damper 100 is configured and arranged to be movably captured within cavity so as to supply sufficient coolant to adjacent blade matefaces, for example with a top surface contoured to conform with respective portions of the inner surfaces of adjacent blade platforms. The damper may also have a contoured edge contoured to conform to a contour of the pressure side of an adjacent blade root portion. Turbine damper 100 has an axially-extending main body 102, a damping surface 104, an inner surface 106, and contoured edges 108 and 110. Contoured edge 110 defines a pressure side edge of turbine damper 100 configured and arranged for mechanical contact with a pressure side of a root portion of an adjacent blade. Contoured edge 108 defines a suction side edge of turbine damper 100 configured and arranged for mechanical contact with a suction side of a root portion of an adjacent blade. As will be appreciated, edges 108 and 110 span inner and damping surfaces 104 and 106 along the axial length of damper 100.

Main body 102 of turbine damper 100 defines a generally arcuate profile and edge contour corresponding contours of adjacent blade root portions, thereby being movably captured by the roots of adjacent turbine blades. Main body 102 of damper 100 defines an upstream segment 112, an upstream transition segment 114, a downstream transition segment 116, and a downstream segment 118. Upstream segment 112 is immediately upstream from upstream transition segment 114. Upstream transition segment 114 is immediately upstream from downstream transition segment 116. Downstream transition segment 116 is immediately upstream from downstream segment 118. Damper 100 can be fabricated from a single sheet of material having suitable dimensions, thickness, and temperature resistance. In an embodiment, damper 100 is fabricated from a cobalt alloy.

At least one of the segments 112, 114, 116, and 118 has a plurality of slotted apertures extending therethrough. In the illustrated embodiment of damper 100, upstream segment 112 has an upstream oriented surface with at least one aperture extending through damper main body 102, upstream transition segment 114 has an arcuate profile and includes at least one aperture extending through damper main body 102, downstream transition segment 116 has an arcuate profile and at least one slotted aperture extending through damper main body 102, and downstream segment 118 has a radially outward facing surface with an at least one slotted aperture extending through damper main body 102. In an embodiment, damper 100 has six slotted apertures. In an exemplary embodiment, damper 100 has eight slotted apertures. As will be appreciated, damper 100 can have any number of apertures as suitable to supply an adequate supply of coolant to an overlaying mateface gap and adjacent blade platform matefaces. Advantageously, embodiments of damper 100 having apertures along segments 112, 113, 114 and 116 provide a uniform supply coolant along the damper length to first and second matefaces 32 and 34.

Referring now to FIG. 3, damper 100 is shown in a two-dimensional plan view. Main body 102 of damper 100 has a plurality of apertures 120 extending through the damper body. Apertures 120 define conduits extending through the damper main body 102, and as would be appreciated, place an overlaying mateface gap and opposed blade platform matefaces in fluid communication with an underlying coolant source. In the illustrated embodiment, main body 102 of damper 100 has a first aperture 122, a second aperture 124, a third aperture 126, a fourth aperture 128, a fifth aperture 130, a sixth aperture 132, a seventh aperture 134, and an eighth aperture 136. Apertures 120 are distributed along segments 112, 114, 116, and 118 such that they are not uniformly spaced or angled with respect to one another. In the illustrated embodiment, apertures 120 also oriented so as to cooperate with the above-described displacement and/or deformation of matefaces 32 and 34 such that the open area of each respective aperture remains substantially constant during engine operation. Advantageously, maintaining substantially constant non-occluded aperture openings during engine operation, notwithstanding damper/mateface relative positional changes, provides uniform mateface cooling while force varies on the airfoil portions of the blades.

With further reference to FIG. 3, axes 138 and 140 of an adjacent aperture pair are shown. Apertures 120 have elongated shapes extending laterally across damper main body 102. The respective elongated shapes of apertures 120 define longitudinal axes, axes 138 and 140 of adjacent sixth and seventh apertures 132 and 134 being illustrated in FIG. 3 for simplicity purposes. Axes 138 and 140 are not parallel, and intersect at an intersection point 142 lying off the surface of damper body 102. In the illustrated embodiment, each respective pair of adjacent aperture defines axes intersecting at a point lying off pressure side 110 of damper main body 102. In another embodiment, each respective pair of adjacent apertures defines axes intersecting at a point lying off suction side 108 of damper main body 102.

Referring now to FIG. 4, damper 100 is shown in perspective view. Damper 100 has a substantially arcuate profile. Because main body 102 of damper 100 defines an arcuate profile, adjacent pairs of aperture may also define planes that are not co-planar, and intersect one another in a line. Axes of adjacent aperture axes can also be skew lines that neither parallel nor intersect and have an apparent intersection point. In the illustrated embodiment of damper 100, axes 144 and 146 form skew lines that define an apparent intersection point 148 off pressure side 110 of damper 100. In the illustrated embodiment, each respective pair of adjacent aperture defines axes forming skew lines and having apparent intersection points lying off pressure side 110 of damper main body 102. In another embodiment, each respective pair of adjacent apertures defines axes forming skew lines and having apparent intersection points lying off suction side 108 of damper main body 102.

Combustion gas force on blade airfoils varies during engine operation. Variation in airfoil force causes the positional arrangement turbine vibration damper to shift within the damper pocket during engine operation. Damper shifting in turn causes the positional relationship of the damper top surface to mateface edges to change during operation. Change to the positional relationship can cause coolant flow through damper apertures to increase or decrease due to change in the aperture size. Advantageously, embodiments of damper 100 having coolant apertures that define longitudinal axes that intersect at a point off the damper surface cooperate with the movement of the mateface edges such that coolant flow substantially consistent over a range of positional arrangements. This reduces the amount of coolant that needs to be supplied to damper apertures during operation. Since coolant is working fluid removed from the compressor after work has been done to increase the pressure of the fluid, reducing the amount of coolant required for mateface edge cooling increases engine efficiency.

Those skilled in the art should also recognize that although the embodiments described herein are illustrated in the context of the first stage of a high pressure turbine, other applications are within the scope of the described embodiments. For example, embodiments can be used in high pressure disks positioned downstream of the first stage disk. Embodiments can also be used in low pressure turbine disk stages. Embodiments of the damper can further be used in different types of gas turbines, including aircraft main engines and APUs, as well as terrestrial or marine gas turbine applications.

While the particular invention has been described with reference to first, second, and third aspects of a best mode embodiment, this description is not meant to be construed in a limiting sense. It is understood that various modifications of the best mode embodiment, as well as additional embodiments of the invention, will be apparent to persons skilled in the art upon reference to this description, without departing from the spirit of the invention, as recited in the claims appended hereto. It is therefore contemplated that the appended claims will cover any such modifications or embodiments as fall within the true scope of the invention.

What is claimed is:

1. A turbine blade vibration damper, comprising:
an axially-extending main body having an inner surface and opposed damping surface, the main body having a plurality of slotted apertures extending from the inner surface to the opposed damping surface;
an edge spanning from the inner surface to the damping surface; and
wherein an adjacent pair of the slotted apertures each have an elongated shape with a longitudinal axis, wherein the longitudinal axes of the adjacent pair of the slotted apertures are not parallel to each other and the longitudinal axes of the adjacent pair of the slotted apertures intersect at a point off the edge of the damper.

2. A damper as recited in claim 1, wherein the longitudinal axes intersect at a point off a pressure edge of the vibration damper.

3. A damper as recited in claim 1, wherein the edge is a contoured edge configured for mechanical contact with a root of a turbine blade adjacent to the damper.

4. A damper as recited in claim 1, wherein the main body has an upstream segment with an upstream oriented face.

5. A damper as recited in claim 4, wherein the upstream segment has a slotted aperture extending therethrough.

6. A damper as recited in claim 1, further comprising a downstream segment with a radially outward facing surface.

7. A damper as recited in claim 6, wherein the downstream segment has a slotted aperture extending therethrough.

8. A damper as recited in claim 1, wherein the main body further comprises a second contoured edge spanning the inner and damping surfaces and configured for mechanical contact with a root of a second turbine blade adjacent to the damper.

9. A damper as recited in claim 1, wherein each of the apertures defines a respective plane, the respective planes being oblique with respect to one another.

10. A damper as recited in claim 1, wherein the main body has at least six slotted apertures.

11. A damper as recited in claim 1, wherein the main body has eight slotted apertures.

12. A turbine blade vibration damper, comprising:
an axially-extending main body having an inner surface and opposed damping surface with a plurality of slotted apertures extending from the inner surface to the opposed damping surface; and
a contoured edge spanning from the inner surface to the damping surface, the contoured edge being configured and arranged for mechanical contact with a root of an adjacent turbine blade, wherein at least a pair of adjacent slotted apertures each has an elongated shape with a longitudinal axis and the at least one pair of the adjacent slotted apertures are not parallel to each other the longitudinal axis of the at least one pair of the adjacent slotted apertures intersect at a point off the contoured edge of the damper.

13. The turbine blade damper of claim 12, wherein the longitudinal axes of the at least one pair of the adjacent slotted apertures intersect off a pressure edge of the damper.

14. A turbine disk, comprising:
a first blade with a blade platform and a blade root, the blade platform having an inner surface and mateface;
a second blade with a blade platform and a blade root, the blade platform having an inner surface and a mateface opposing the first blade mateface;
a vibration damper having an axially-extending main body with an inner surface and opposed damping surface, the main body having a plurality of slotted apertures extending from the inner surface to the opposed damping surface;
an edge spanning from the inner surface to the damping surface; and
wherein an adjacent pair of the slotted apertures each have an elongated shape with a longitudinal axis, wherein the longitudinal axes of the adjacent pair of the slotted apertures are not parallel to each other and the longitudinal axes of the adjacent pair of the slotted apertures intersect at a point off the edge of the damper, the damper being movably captured within a cavity defined by the blade roots, and respective portions of the platform inner surfaces, wherein coolant is fluidly communicative with the opposing matefaces through the damper slotted apertures, and wherein the damper slotted apertures are configured and arranged to supply a consistent coolant flow to the opposing matefaces of the first blade and the second blade as the damper moves within the cavity.

15. A disk as recited in claim 14, wherein the axes intersect at a point off a pressure side edge of the damper.

* * * * *